United States Patent [19]
Davis et al.

[11] Patent Number: 5,971,288
[45] Date of Patent: Oct. 26, 1999

[54] EXPANSION COMPOSITION

[75] Inventors: Lora L. Davis, Brentwood, N.H.; James P. O'Shea, Riverside, R.I.; Eric B. Thorstensen, Clarkston, Mich.

[73] Assignee: Standard-Thomson Corporation, Waltham, Mass.

[21] Appl. No.: 08/837,813

[22] Filed: Apr. 22, 1997

[51] Int. Cl.[6] ............................................. G05D 23/275
[52] U.S. Cl. ............................. 236/68 R; 60/528; 251/11
[58] Field of Search ............................. 60/528; 318/117; 236/68 B, 68 R; 251/11

[56] References Cited

U.S. PATENT DOCUMENTS

| 2,797,546 | 7/1957 | Reddi | 318/117 |
| 2,932,454 | 4/1960 | Dillman | 60/528 |
| 3,016,691 | 1/1962 | Asakawa et al. | 60/528 |
| 3,395,580 | 8/1968 | Kuze | 236/100 |
| 4,583,365 | 4/1986 | John | 60/528 |
| 4,587,931 | 5/1986 | Duprez | 123/41.15 |
| 4,666,081 | 5/1987 | Cook et al. | 236/68 R |
| 4,672,920 | 6/1987 | Duprez | 123/41.15 |
| 5,385,296 | 1/1995 | Kurz et al. | 236/34.5 |
| 5,582,138 | 12/1996 | Ziolek et al. | 123/41.1 |

FOREIGN PATENT DOCUMENTS 30 18 682 A1  11/1980  Germany.

*Primary Examiner*—William E. Tapolcai
*Attorney, Agent, or Firm*—Barnes & Thornburg

[57] ABSTRACT

A thermostatic control valve has an expansion composition held in a cavity thereof. The composition contains electrical conductor particles dispersed throughout an electrical isolator. The particles conduct electrical current through the isolator when the electrical isolator has a volumetric size that is less than a predetermined expanded volume. When the isolator expands to the predetermined expanded volume, the distance between the particles is increased to the extend that the electrical current cannot be conducted.

4 Claims, 3 Drawing Sheets

FIG. I

EXPANSION COMPOSITION

BACKGROUND AND SUMMARY OF THE INVENTION

The present invention is directed to an expansion composition. More particularly, the present invention relates to an expansion composition that is capable of forming a gel-like substance when heated, having a volume that fluctuates as a function of the temperature of the expansion composition, and preferably creating its own heat when current flows therethrough. Most particularly, the present invention relates to an expansion composition that includes an expandable electric isolator, an elastomer, and electrical conductor particles dispersed throughout the electric isolator and elastomer.

Conventional shock absorbers, damping apparatuses, temperature sensitive actuators, and the like use waxes to perform various functions. Waxes are known to exhibit suitable damping properties in conventional shock absorbers and suitable flow properties in hydraulic devices. Waxes, however, pose difficulties to manufacturers, when placed within shock absorbers and within hydraulic devices. For example, when shock absorbers are used under severe conditions, such as on a rough terrain, the frictional movement of the shock creates internal heat causing the wax to become fluidized and perhaps flow out of the device.

A similar situation can result in a hydraulic device when the device is subjected to multiple compressions or expansions. In addition to shock absorbers and hydraulic devices, waxes are also used in wax motors that open and close flow valves in thermostats that control coolant fluid flow from an engine to a radiator. During operation of such a thermostat, wax that is held inside the thermostat's motor melts and expands as the engine coolant temperature rises above a pre-determined level. The wax expansion causes movement of a piston that, in turn, opens the flow valve to permit coolant flow from the engine to the radiator.

Waxes are poor electrical conductors and require an external heating source if they are to melt and to expand. Despite their poor electrical conductive properties, waxes are of particular interest for use in thermostat motors because waxes expand over temperature ranges of practical significance and are both plentiful and inexpensive. Therefore, in conventional electronically actuated thermostats, electrical heaters are provided to melt the wax held within the wax motor. The external heaters, however, are often cumbersome and add to the manufacturing costs of the thermostat. What is needed is an expansion composition that is inexpensive to manufacture, whose components are plentiful, that forms a gel-like substance when melted, and that preferably selectively regulates the flow of electricity therethrough causing selective self-heating and self-cooling and thus expansion and contraction of the expansion composition without the need for additional heaters and electrical connections.

According to the present invention an expansion composition for use in an electric thermostatic control valve apparatus is provided. The expansion composition is formed to fluctuate in volumetric size between a pre-determined normal operating volume and a pre-determined expanded volume. The expansion composition comprises about 52 to about 58 percent by weight of an expandable electrical isolator and electrical conductor particles dispersed throughout the isolator. The conductor particles are present in the expansion composition in an amount sufficient to conduct electric current flow through the electrical isolator when the expansion composition has the pre-determined normal operating volume and until the expansion composition has increased in volumetric size to the pre-determined expanded volume where the isolator component has substantially isolated the conductor particles from one another.

According to another embodiment of the present invention, there is provided an expansion composition that is capable of melting to a gel-like consistency when heated and of expanding in volumetric size. The expansion composition comprises about 75 to about 97 percent by weight of an expandable electrical isolator and about 3 to about 25 percent weight elastomer. In preferred embodiments, the expansion composition comprises electrical conductor particles scattered throughout the isolator so that the expansion composition will conduct electrical current therethrough during pre-selected conditions.

According to yet another embodiment of the present invention, there is provided an electrically stimulated actuator apparatus for use in a thermostatic control valve. The apparatus comprises an electrically conductive housing having walls that define a cavity, an expansion composition that is held within the cavity and that selectively conducts electrical current therethrough, and a piston that extends into the cavity and engages the expansion composition. When electrical current is initially applied to the expansion composition, the current passes through the expansion composition causing it to melt and therefore increase in volumetric size. This increase in expansion volume forces the piston out from the cavity. The ability of the expansion composition to conduct electrical current therethrough is a function of the volume of the expansion composition. So, when the expansion volume of the expansion composition has increased to a pre-determined expanded volume pressing the piston to the fully extended position, the expansion composition itself substantially blocks the flow of electric current therethrough. As a result, the temperature of the expansion composition begins to cool and its expansion volume to decrease in volumetric size allowing the piston to move back into the cavity.

Further, in accordance with yet another embodiment of the present invention there is provided a thermostatic control valve apparatus for controlling fluid flow through an engine cooling system. The apparatus includes an electrically conductive stationary valve member that has a valve seat, a moveable valve member, an electrically conductive motor coupled to the movable valve member, and a spring that extends between the stationary valve member and the electrically conductive motor to help bias the movable valve member to a normally closed position against the valve seat. The electrically conductive motor includes an electrically conductive housing that defines a cavity, an electrically conductive piston that extends into the cavity, and a selectively conductive expansion composition held in the cavity in communication with the piston. The expansion composition comprises an expandable electrical isolator and electrical conductor particles dispersed throughout the isolator. The expansion composition's volume is a function of the expansion composition's temperature and it's temperature is a function of the amount of electrical current running therethrough. The ability of the expansion composition to conduct electrical current therethrough is in turn a function of the volume of the expansion composition. Therefore, when the particles conduct electrical current through the expansion composition, the temperature of the isolator component increases causing the expansion composition to melt and therefore increases in volumetric size. The increase in volumetric size forces the piston out from the cavity where it presses the moveable valve member to an open position away from the valve seat. When the volumetric size of the expansion composition has increased to the pre-determined expanded volume, the conductor particles become substantially isolated from one another and are substantially prevented from conducting electric current through the isolator component. As a result, the temperature and thus the volumetric size of the expansion composition begins to decrease. As the expansion volume decreases, the particles again become in electrical communication with one another and thus the expansion composition's ability to conduct electricity increases. So, depending upon the electric signals provided to the ECM from the sensors and the ECM's response to those signals, the expansion composition may either remain heated and keep the piston pressed out from the cavity or be permitted to cool allowing the spring to bias the piston back into the cavity.

The expansion composition of the present invention also serves as a fail-safe mechanism for electrically actuated motors. Should a controller or an electrical connection fail, heated fluid flow through an engine block and past the electrically conductive motor that houses the expansion composition will increase the temperature of the expansion composition causing the expansion composition to melt. As previously discussed, the melted expansion composition expands in volumetric size and forces the piston out from the cavity and thus the movable valve away from the valve seat.

Advantageously, the expansion composition of the present invention enables manufacturers of shock absorbers, hydraulic devices, and electronically actuated thermostats to use an inexpensive and plentiful expansion composition having the benefits of traditional wax without the difficulties associated with liquidation of the melting wax and the added expense of electric heaters and additional wiring. Additionally, in preferred embodiments manufacturers are able to change the fail-safe actuation temperature of a thermostat by simply manipulating the electrical isolator component of the expansion composition.

Additional objects, features, and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
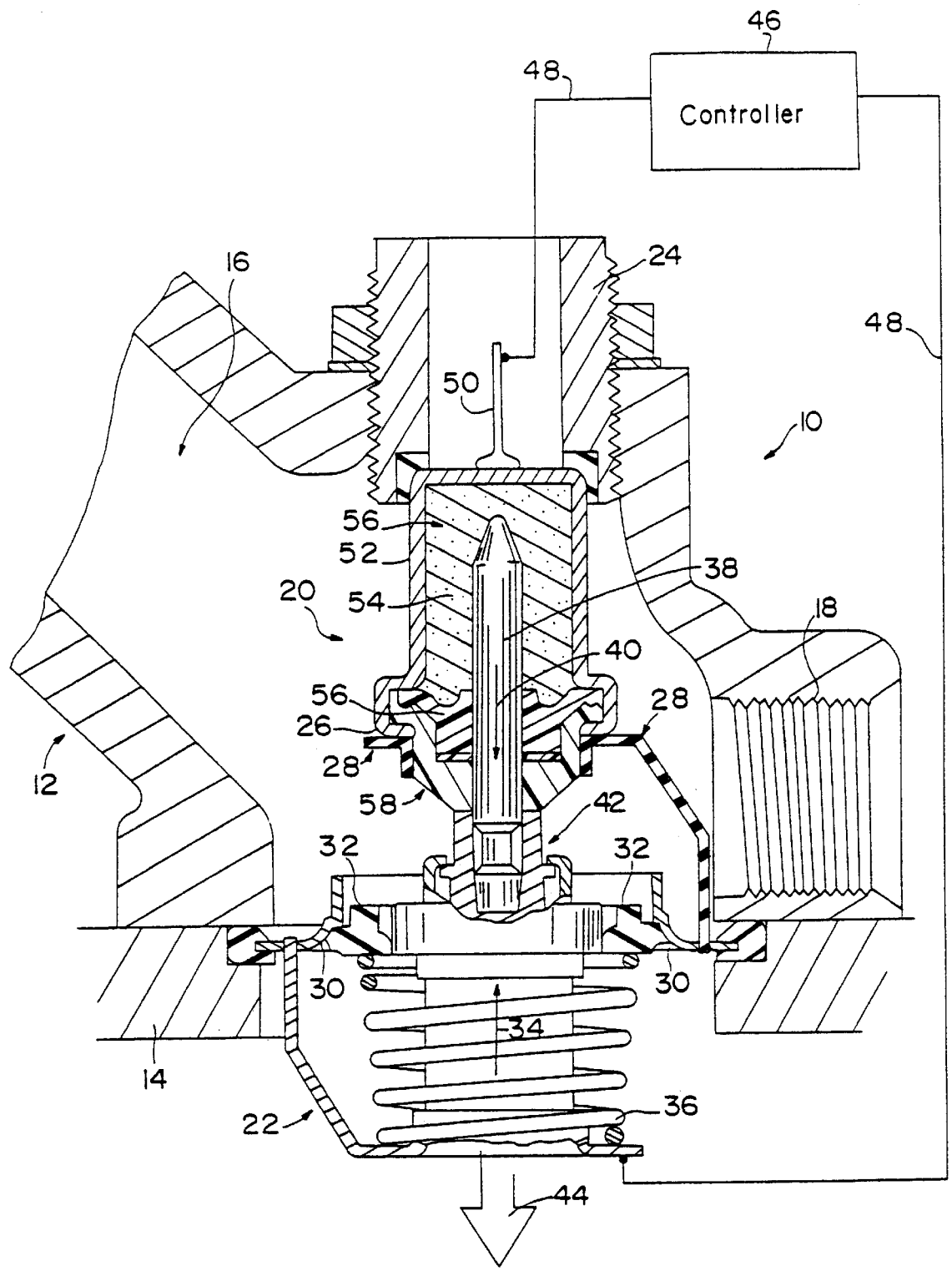
FIG. 1 is a sectional view taken through an engine block and housing illustrating an electronic thermostat of the present invention including a motor and a valve mounted in a main coolant fluid flow passageway of the engine for controlling fluid flow to a radiator.

In accordance with the present invention there is provided an expansion composition for use in a variety of devices that operate as shock absorbers, hydraulic devices, and actuators. The present invention is particularly suited for use in devices that are exposed to sudden increases and decreases in temperature. It has been found that when an elastomer is blended together with an electrical isolator such as a polymer, preferably one or a mixture of alkane waxes, the expansion composition is capable of forming a viscous gel-like substance upon melting rather than a free-flowing liquid over temperatures of a practical significance. This melting characteristic is beneficial in shock absorbers and in hydraulic devices where repeated use creates high temperatures, often fluidizing expansion compositions held within their interiors. This melting characteristic is also beneficial in thermostats where external temperatures are elevated.

It has also been discovered that when electrically conductive particles are dispersed throughout the electrical isolator, the expansion composition behaves as an electrical conductor at certain pre-determined expanded volumes. When the expansion composition has a pre-determined normal operating volume, electrical current applied to the expansion composition easily passes therethrough, causing the temperature of the expansion composition to increase. As the temperature of the expansion composition increases, the polymer component of the expansion composition begins to melt and to increase in volumetric size. This volume expansion begins to separate and isolate the conductor particles from one another, thus inhibiting the flow of electrical current through the expansion composition. The expansion composition will continue to increase in temperature and to expand in volumetric size as electric current is applied thereto and until the expansion composition reaches a pre-determined expanded volume. At this time, the polymer component of the expansion composition will have substantially isolated the conductor particles from one another, substantially blocking current flow through the expansion composition. This reduction in current flow causes a decrease in the temperature of the expansion composition and thus its volumetric size. Therefore, an electrical apparatus that includes the expansion composition of the present invention is able to easily regulate the expansion volume of the expansion composition without the need for additional heaters and electrical connections to externally heat the expansion composition.

As used in this description and claims, the phrase "pre-determined normal operating volume" will be used to denote the volumetric size of any referred-to compound or expansion composition that is at a temperature at which it has formed in a semi-solid or solid state. The phrase "pre-determined expanded volume" will be used to denote any referred-to compound or expansion composition that is at a temperature at which it has formed a substantially viscous gel-like substance, that has a volumetric size that is greater than the pre-determined normal operating volume, and whose volumetric size is sufficient to isolate the conductor particles from one another blocking current flow through the expansion composition. Likewise, the phrase "expansion volume" as used throughout the specification and claims denotes the volumetric size of the expansion composition between the pre-determined normal operating volume and the pre-determined expanded volume of the expansion composition.

In a preferred embodiment of the present invention, the expansion composition comprises an electric isolator and a blend of discrete electrical conductor particles dispersed throughout the electrical isolator. The conductor particles are not necessarily in physical contact with one another. The conductor particles are, however, close enough to one another so as to communicate electrical current therebetween at the pre-determined normal operating volume of the expansion composition. As the current flows through the expansion composition, or as heat is externally applied to the expansion composition, the temperature of the expansion composition rises and the electrical isolator component softens. As the expansion composition melts, it expands in volumetric size to an expansion volume approaching the pre-determined expanded volume. This melted expansion composition is believed to consist of discrete electrical conductor particles surrounded by the expanded electrical isolator. The conductor particles are therefore substantially isolated from one another at the pre-determined expanded volume. This isolation severely restricts and even blocks current flow that is applied to the expansion composition. The pre-determined expanded volume is about 8% to about 22% greater in volumetric size than the pre-determined normal operating volume of the expansion composition. Preferably the expansion volume is about 12% to about 20%, and most preferably about 16% to about 20% greater in volumetric size than the pre-determined normal operating volume of the expansion composition.

Suitable electrical isolators for use in the present invention are selected from alkane waxes and base polyethylene waxes. Suitable alkane waxes include n-Hexane, n-Heptane, n-Octane, n-Nonane, n-Decane, 2,2,4,6,6-Pentamethylheptane, n-Undecane, n-Dodecane, n-Tridecane, n-Tetradecane, n-Pentadecane, 2,4,4,6,8,8-Neptamethylnonane, n-Hexadecane, n-Heptadecane, n-Octadecane, n-Nonadecane, n-Eicosane, n-Heneicosane, n-Docosane, n-Tricosane, n-Tetracosane, n-Pentacosane, n-Hexacosane, n-Octacosane, n-Triacontene, n-Dotriacontane, n-Tetratriacontane, n-Hexatriacontane, n-Octatriacontane, n-Tetracontane, n-Tetratetracontane. In preferred embodiments, the alkane waxes are selected from n-hexatriacontane, n-octacosane, n-eicosane, n-octadecane, n-heptadecane, n-hexadecane, n-pentadecane, n-tetradecane, n-decane, and n-nonane. A suitable polyethylene wax is Polywax 655 Polyethylene, which is commercially available from Petrolite Corporation, St. Louis, Mo. It is understood that other compounds having electrical isolator and expansion properties may be suitable for use in accordance with the present invention.

The average molecular weight (mw) of the electrical isolator is about 170 to about 56,000. It is noted that the molecular weight of the electrical isolator has a minimal effect on the ability of the expansion composition to fluctuate in volumetric size. The molecular weight of the electrical isolator instead correlates with the temperature at which the electrical isolator melts. Therefore, the electrical isolator is selected according to the desired actuation temperature of an actuator. So, for a thermostat designed to actuate at a temperature of about 200° F. (93.3° C.), the electrical isolator suitable for use with the present invention has an average molecular weight of about 700 to about 725. The expansion composition of the present invention comprises about 52 to about 58 percent by weight electrical isolator. More preferably the expansion composition comprises about 56 to about 58 percent by weight electrical isolator, and most preferably about 57 percent by weight electrical isolator.

Electrical conductors suitable for use with the present invention are selected from one or a mixture of electrically conductive carbons or conductive metals. Non-limiting examples of conductors that may be formulated into the invention include commercially available graphite copper, iron, platinum, aluminum, nickel, silver, and gold. In preferred embodiments, the conductor is selected from graphite and copper. It is understood, however that the conductors may be present in the expansion composition individually or as a mixture. The electrical conductor is present in the expansion composition in a powder form having a particle size ranging from about 80 to about 1500 mesh (U.S. Standard), more preferably about 150 to about 950 mesh. In addition, the expansion composition comprises about 18 to about 42 percent by weight electrical conductor. Preferably, the expansion composition is about 34 to about 42 percent by weight conductor, and most preferably about 40 to about 42 percent by weight conductor.

In preferred embodiments, the expansion composition of the present invention preferably comprises elastomers for structural support. It is believed that the elastomer increases the viscosity of the expansion composition so that the expansion composition forms a viscous semi-solid gel state as it melts under temperatures of practical significance. Thus, the electrical isolator component is permitted to melt without causing the expansion composition to become a fluidized liquid under temperatures of practical significance. Thus, the elastomer prevents the electrical isolator component from separating from the other components in the expansion composition. Elastomers suitable for use in the present invention may be selected from a variety of natural unvulcanized rubbers and plasticers. Non-limiting examples of suitable elastomers include an olefin polymer such as ethylene propylene copolymer/terpolymer/oil extended polymer, natural polyisoprene, synthetic polyisoprene, otyrenibudadiane, isobutylene-isoprene, polynorbornene, and nylon. It is understood that many of the other commercially available elastomers are suitable for use with the present invention. The expansion composition suitable for selectively conducting electrical current therethrough includes about 0 to about 29 weight percent elastomer and more preferably about 0.4 to about 8.7 weight percent elastomer. Most preferably, the expansion composition includes about 2 to about 6 percent by weight elastomer.

In another embodiment of the present invention, the expansion composition comprises an electrical isolator and an elastomer. Thus, by selecting an appropriate electrical isolator and elastomer as previously set forth, manufacturers are able to formulate an expansion composition that is capable of melting to a viscous gel-like phase over temperature ranges of practical significance. Preferably, the temperature range of practical significance at which the expansion composition melts to the viscous gel-like phase is between about 60° F. (15.0° C.) to about 350° F. (177° C.). More preferably the temperature range of practical significance are about 80° F. (26.6° C.) to about 275° F. (135° C.). The expansion composition of the present invention that is capable of melting to a viscous gel-like substance over temperature ranges of practical significance comprise about 75 to about 97 percent by weight electrical isolator, more preferably, about 85 to about 95 percent by weight electrical isolator, and most preferably about 93 to about 95 percent by weight electrical isolator. In addition, said expansion composition comprises about 3 to about 25 percent by weight elastomer, preferably about 35 to about 15 percent by weight elastomer, most preferably about 5 to about 7 percent by weight elastomer.

In another embodiment of the present invention, the expansion composition is used in an electrically stimulated actuator apparatus. The electrical conductor is present in the expansion composition in an amount sufficient to conduct electric current flow through the expansion composition when the expansion composition is at the pre-determined operating volume and until the particles are substantially isolated from one another at the pre-determined expanded volume of the expansion composition. The expansion composition of the present invention differs from currently available wax motor compositions in that the present invention includes electrical conductor particles dispersed throughout the electrical isolator to selectively conduct electricity, thereby raising the temperature of the expansion composition. The dispersement of conductor particles throughout the electrical isolator adds a self-regulating quality to the expansion composition. It is understood that the expansion composition of the present invention can also include optional ingredients such as elastomers to aid in its formulation.

Details of a self-regulating electrically stimulated thermostat 10 in accordance with the present invention are illustrated in FIG. 1. Thermostat 10 is coupled between a housing 12 and engine block 14. Housing 12 includes a main flow passageway 16 and a bypass flow passageway 18. Thermostat 10 includes a self-regulating electrically stimulated motor 20 and a valve assembly 22. The motor 20 is coupled to the housing 12 by a threaded coupler 24. Coupler 24 is adjusted until a shoulder 26 of motor 20 engages an electrically insulating frame 28 of valve assembly 22. Valve assembly 22 is mounted between the housing 12 and the engine block 14 in a conventional manner to control flow of coolant fluid to or from the radiator (not shown). Valve assembly 22 includes a stationary annular valve seat 30 and a movable valve member 32. Movable valve member 32 is biased in a normally closed position in the direction of arrow 34 by spring 36. When motor 20 is electrically stimulated as discussed in detail below, stem or piston 38 moves in the direction of arrow 40 against a stud 42. Stud 42 transfers motion through override spring (not shown) to move movable valve member 32 downwardly in the direction of arrow 40 to open valve member 32 and permit main flow of the coolant between main flow passageway 16 and the radiator (not shown) in the direction of arrow 44 or in a reverse direction depending upon the location of the thermostat 10. Stud 42 and override spring (not shown) create a safety override mechanism that is actuated only when the movable valve 32 is fully opened and spring 36 is at its solid length and when the piston 38 continues to move in the direction of arrow 40.

Advantageously, motor 20 is located in the coolant fluid flow. Therefore, in the case of a malfunction of controller 46, or the electrical connection to thermostat 10, rising coolant fluid temperature heats an expansion composition 53 inside the motor 20 and causes piston 38 to stroke in the direction of arrow 40 to open valve 32 and permit coolant fluid flow to radiator (not shown) in the direction of arrow 44. Therefore, by locating the motor 20 within the coolant fluid flow, the electrically stimulated thermostat 10 of the present invention provides a fail safe mechanism to reduce the likelihood of an overheat condition. An electrical lead 50 for coupling controller 46 to thermostat 10 is located outside housing 12. By providing the electrical connection outside of the coolant fluid, the apparatus of the present invention reduces the likelihood of any electrolysis or damage of the electronic components due to coolant fluid flow.

Figure 2:
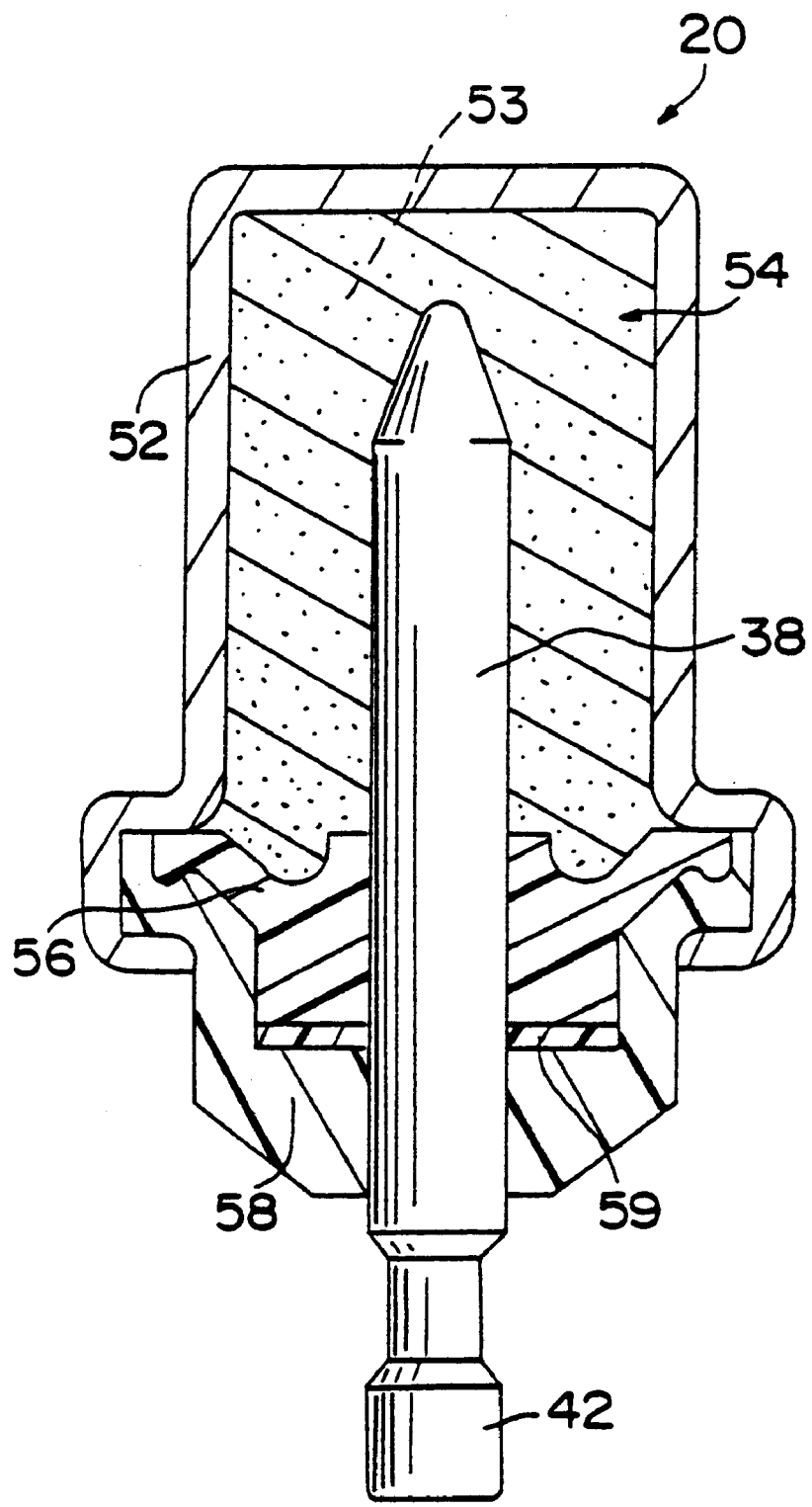
FIG. 2 is a sectional view taken through the motor having a piston extending into an expansion composition situated in a housing and showing the piston positioned in an initial pre-determined compressed position.
Figure 3:
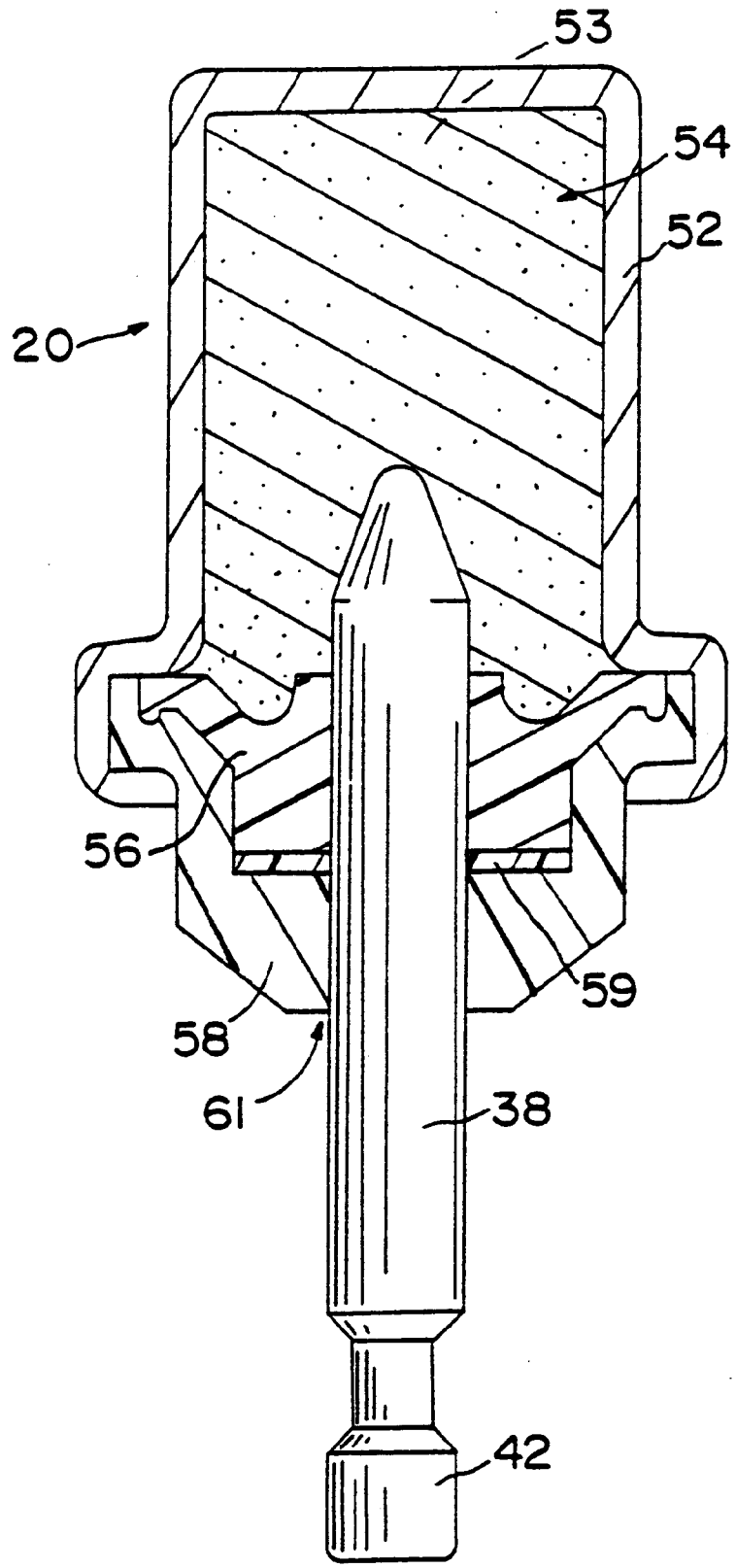
FIG. 3 is in a view similar to FIG. 2 showing the piston in an extended position after the expansion composition has increased in volumetric size to the pre-determined expanded volume.

Further details of the motor 20 are illustrated in FIGS. 2 and 3. Motor 20 includes a housing 52 filled with the expansion composition 53 in accordance with the present invention. The expansion composition 53 is situated in a cavity 54 in the housing 52. Motor 20 also includes a sleeve 56 and a cover 58 having an aperture 61 therethrough. A seal 59 is situated between the sleeve 56 and the cover 58. The cover 58 securely holds the expansion composition 53 within the cavity 54 of the housing 52. The expansion composition 53 is formed to selectively create its own heat when electrical current is applied thereto and to defuse the heat throughout the components of the expansion composition. Self-heating of the expansion composition 53 causes melting, thus increasing the volumetric size of the expansion composition 53 within the cavity 54. Given the fixed volume of the cavity 54, the pressure from the expanding expansion composition 53 is transformed into radial and axial forces to actuate the piston 38 through the aperture 61 of the cover 58. Thus, the piston 38 is driven outwardly from an initial pre-determined compressed position as shown in FIG. 2 to a pre-determined extended position as shown in FIG. 3.

To operate the thermostat 10 in accordance with the present invention, the electrical current is supplied to the expansion composition 53 by the electrical lead 50 that is attached to the motor housing 52. See FIG. 1. The output signal from controller 46 is coupled to the electrical lead 50. Illustratively, the output signal from controller 46 is a +12 V DC signal. It is understood that power requirements may vary depending on the size of motor 20 and that the output signal may an AC signal. To operate the motor 20, current passes between the housing 52 and piston 38 to make a circuit. Specifically current passes through the lead 50, the housing 52, the expansion composition 53, the piston 38, and the valve assembly 22 to ground that is provided by the engine block 14. It is understood that the current direction through the circuit may vary in accordance with the present invention. Current flow through the expansion composition 53 causes the components of the expansion composition 53 to rise in temperature. This increase in temperature is dissipated through the expansion composition 53 so that the expansion composition 53 as a whole melts and increases in volumetric size. The volumetric expansion of the electrical isolator and thus the increase in the expansion volume of the expansion composition 53 forces the piston 38 outwardly in the direction of arrow 40 to open valve 32. So, when the expansion volume of the expansion composition 53 has increased to the pre-determined expanded volume, the piston 38 is in the pre-determined extended position shown, for example in FIG. 3.

Importantly, when the expansion composition 53 has increased in volumetric size to the pre-determined expanded volume, the conductor particles are substantially isolated from one another and thus the flow of electric current therebetween is effectively blocked. As a result, the temperature of the expansion composition 53 begins to cool and its volumetric size begins to decrease from the pre-determined expanded volume. As the expansion volume decreases, the conductor particles are again in electrical communication with one another and thus electrical current may be conducted through the expansion composition 53. So, depending upon the electric signals provided to the ECM from the sensors and the ECM's response to those signals, the controller 46 will either supply electric current to the electrical lead 50 or refrain from applying said current. Thus, the expansion composition 53 will remain heated if the controller 46 supplies current to the lead 50 to keep the piston 38 pressed out from the cavity 54 (FIG. 3).

The expansion composition 53 will, however, cool if the controller 46 refrains from supplying current to the expansion composition 53. Notably, when the expansion composition 53 cools, the spring 36 biases the piston 38 back into the cavity 54 of the motor housing 52. See FIGS. 1 and 2. Therefore, the temperature of the expansion composition 53 is dependent upon both the electrical current provided by the controller 46 and the volumetric size of the expansion composition itself. By selecting the relative weight percentages of the electrical isolator and the conductor particles, the pre-determined expanded volume of the expansion composition and thus the length of the piston stroke can be calculated. Moreover, by selectively limiting the amount of current applied to the expansion composition 53, the thermostat 10 is capable of maintaining engine temperature at any desired temperature within maximum and minimum temperature levels.

EXAMPLE 1

Expansion compositions A–C having the formulas set out in Table 1 were prepared according to the following protocol. All percentages reflect the weight percentage of the expansion composition.

TABLE 1

| | FORMULATION | | |
|---|---|---|---|
| | A(wt. %) | B(wt. %) | C(wt. %) |
| Vistalon* 3708 (Pellets) | 4.6 | 3.5 | 2.9 |
| Graphite (Powered) | 42.0 | 42.0 | 42.0 |
| Ethylene homopolymer (655 MW) | 53.4 | 54.5 | 55.1 |

*Vistalon is an uncured rubber commercially available from Exxon Chemical of America.

A. The ethylene homopolymer was placed into a high intensity mixing vat. The ethylene homopolymer was heated in the mixing vat to a temperature of 250° F. (121.1° C.) and melted. During the melting, the ethylene homopolymer was stirred at an average rate of 750 rpm.

B. The unvulcanized rubber pellets were then added to the melted ethylene homopolymer. The rubber/homopolymer blend was stirred in the mixing vat at a temperature of about 240° F. to about 250° F. (115.5–121° C.) and at a maximum rpm of about 1725 for 20 minutes. At this time, the rubber/homopolymer blend appeared to be a viscous and substantially homogenous expansion composition. As used throughout the specification and claims, the term homogenous denotes an expansion composition that is substantially free of visibly distinct unmelted material.

C. After the rubber/homopolymer blend appeared to be substantially homogenous, the powdered graphite was slowly added to the mixing vat. The rubber/homopolymer blend and the graphite was mixed for five minutes at a speed of about 750–1200 rpm. After five minutes, unstirred buildup was removed from the sides of the mixing vat and combined with the stirred components. The rubber/homopolymer blend and the graphite was allowed to mix for an additional five minutes at a spread of about 1200 rpm to form the expansion composition of the present invention.

D. A sheet was then placed on a lifter and a forming grate was placed onto the sheet. The expansion composition, which now had a viscous-liquid consistency, was scooped into the forming grate on the sheets. Using a trowel, the expansion composition was spread over and into the grate mold. The casts were placed into a cooling rack and cooled. The now semi-solid to solid expansion composition was cut and positioned into a cavity of a thermostat motor housing.

EXAMPLE 2

Expansion compositions A–D having the formulas set out in Table 2 and wherein the elastomer has a melting point that is higher than the melting point of the isolator are prepared in accordance with the following protocol. All percentages reflect the weight percentage of the expansion composition.

TABLE 2

| | FORMULATION | | | |
|---|---|---|---|---|
| Components | A(wt. %) | B(wt. %) | C(wt. %) | D(wt. %) |
| Uncured Rubber | 0.4 | 2 | 10 | 24 |
| Electrical Conductor (80–1500 mesh) | 41.6 | 42 | 33 | 18 |
| Electrical Isolator | 58.0 | 56 | 57 | 58 |

The uncured rubber is first placed into a mixing tank and heated at a temperature that is greater than the melting point of the rubber. The uncured rubber is heated until it has substantially melted and formed a viscous liquid. The electrical isolator is heated in a separate mixing tank to a temperature sufficient to substantially melt the electrical isolator and to form a viscous liquid. The viscous rubber is then added to the viscous isolator with stirring. The elastomer and isolator are mixed in the mixing tank for 10 minutes at a speed of about 1725 rpm. The temperature of the blend is maintained at a temperature sufficient to melt the electrical isolator. The electrical conductor is then added to the viscous elastomer/isolator and mixed in accordance with Example 1 to form the expansion composition of the present invention.

EXAMPLE 3

Expansion compositions 1–13 having the following formulations are prepared in accordance with the previously-described method of Example 1. The expansion compositions are set out in Table 3. Percentages are weight percentages of the expansion composition.

TABLE 3

| Sample # | % Elastomer | % Electrical Conductor (80–1500 mesh) | % Expandable Electrical Isolator |
|---|---|---|---|
| 1 | 0 | 42 | 58 |
| 2 | 0.4 | 41.6 | 58 |
| 3 | 1.1 | 41.5 | 57.4 |
| 4 | 2.9 | 40.0 | 57.1 |
| 5 | 5.8 | 36.4 | 57.8 |
| 6 | 8.7 | 34 | 57.3 |
| 7 | 11.6 | 31.3 | 57.1 |
| 8 | 14.5 | 28.7 | 56.8 |
| 9 | 17.4 | 26.8 | 55.8 |
| 10 | 20.3 | 24.3 | 55.4 |
| 11 | 23.2 | 22.9 | 53.9 |
| 12 | 26.1 | 20.5 | 53.4 |
| 13 | 29.0 | 18.2 | 52.8 |

As the weight percentage of the isolator component of the expansion composition increases, the expansion volume percentage of the expansion composition also increases. Thus, such an expansion composition is well suited for use in actuators that must move a piston over a rather large distance. That is, the expansion composition will generally increase in volumetric size as the isolator component melts, thus pushing the piston a great distance out from the housing. As the weight percentage of isolator component of the expansion composition decreases, however, the percentage of the expansion of the expansion composition decreases. Therefore, such an expansion composition is suitable for use in thermostats that must only move the piston a rather short distance.

Similarly, as the weight percentage of the conductor particles increases in the expansion composition, the isolator component of the expansion composition will be less able to isolate the particles from one another. Therefore, an expansion composition that has a relatively high weight percentage of conductor is suitable for use in an actuator that operates over a wide temperature range. The conductor particles will continue to conduct electric current as the isolator expands allowing the isolator to increase in volume and the piston to be continually pressed out from the housing as the temperature increases. As the weight percentage of the conductor particles in the expansion composition decreases, the isolator component is better able to isolate the particles. Therefore an expansion composition that has a relatively low weight percentage of conductor is suitable for use in a thermostat that operates over a limited temperature range.

In addition, as the weight percentage of the elastomer component increases, the viscosity of the expansion composition increases when the expansion composition has expanded to the pre-determined expanded volume. Such an expansion composition would be particularly suited for use in a shock-absorbing device that is prone to produce heat when exposed to multiple impacts.

EXAMPLE 4

Expansion compositions a–j having the following formulations are prepared in accordance with the protocol described in Example 2. The expansion compositions are set out in Table 4. Percentages are weight percentages of the expansion composition.

TABLE 4

| Sample | % Elastomer | % Expandable Electrical Isolator | Viscosity at 250° F. (121° C.) |
|---|---|---|---|
| a | 0 | 100 | Liquid |
| b | 1 | 99 | Very Thin |
| c | 3 | 97 | Thin to Thick |
| d | 5 | 95 | Thick |
| e | 7 | 93 | Thick |
| f | 10 | 90 | Thicker |
| g | 12 | 88 | Very Thick |
| h | 15 | 85 | Very Thick |
| i | 20 | 80 | Very Thick |
| j | 25 | 75 | Thickest |

Notably, "liquid" as used in Table 4 denotes an expansion composition having a specific gravity less than or equal to about the specific gravity of water ($H_2O=1$). The term "thickest" as used in Table 4 denotes an expansion composition that exhibits poor flowability characteristics and is approaching a semi-solid state.

As the weight percentage of the elastomer component of the expansion composition increases, the fluidization of the expansion composition upon melting decreases. Thus, as the weight percentage of the elastomer in the expansion composition increases, the viscosity of the expansion composition when melted increases. Thus, for example, expansion compositions having a thick to thickest viscosity rating are best suited for use in shock absorbers that are subject to vigorous use.

Although the invention has been described in detail with reference to a preferred embodiment, variations and modifications exist within the scope and spirit of the invention as described and defined in the following claims.

What is claimed is:

1. An electrically stimulated actuator apparatus for use in a thermostatic control valve, the apparatus comprising a thermal and electronically conductive housing having two end walls connected together by a side wall for defining a closed volume cavity, a piston extending into the cavity of the housing, the piston passing through one of the end walls and moveable away from the other end wall to increase the size of the cavity, the piston spaced from the side wall, and an expansion composition held in the cavity in communication with an end and side of the piston, the expansion composition including an electrical isolator being formed to increase in temperature as electrical current flows therethrough and configured to expand volume from a pre-determined normal operating volume to a pre-determined expanded volume as the temperature of the expansion composition increases and electrical conductor particles dispersed throughout the electrical isolator and being present in an amount sufficient to conduct electrical current through the electrical isolator when the electrical isolator has a volumetric size that is less than the predetermined expanded volume;

a first electrical contact attached to the housing;

a second electrical contact attached to the piston;

a source of electrical current for passing a current flow between the two electrodes;

the piston being configured to move away from the cavity when the expansion composition expands in volumetric size to a volume greater than the pre-determined normal operating volume; and wherein the expansion of the expansion composition is determined by the amount of current flow between the electrodes, the extent the piston extends into the cavity and heat flows into and out of the cavity through the thermally conductive housing.

2. The apparatus of claim 1, wherein the conductor particles have an average particle size of about 80 to about 1500 mesh.

3. The apparatus of claim 2, wherein the electrical isolator is a wax that expands in volume as the temperature of the expansion composition increases.

4. The apparatus of claim 2, wherein the electrical conductor is selected from the group consisting of electrically conductive carbon and electrically conductive metals.

* * * * *